US012584571B2

(12) United States Patent
Millet et al.

(10) Patent No.: US 12,584,571 B2
(45) Date of Patent: Mar. 24, 2026

(54) SET OF PIPES COMPRISING AN IMPROVED RETAINING SYSTEM

(71) Applicant: Airbus Operations SAS, Toulouse (FR)

(72) Inventors: Gérard Millet, Toulouse (FR); Vincent Delpy, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/883,272

(22) Filed: Sep. 12, 2024

(65) Prior Publication Data

US 2025/0092971 A1 Mar. 20, 2025

(30) Foreign Application Priority Data

Sep. 14, 2023 (FR) ........................................ 2309699

(51) Int. Cl.
*F16L 21/06* (2006.01)
(52) U.S. Cl.
CPC .................................... *F16L 21/06* (2013.01)
(58) Field of Classification Search
CPC ......... F16L 21/02; F16L 21/06; F16L 21/065; F16L 2201/20
USPC .......................................... 285/114, 417, 420
See application file for complete search history.

(56) References Cited

U.S. PATENT DOCUMENTS

| | | | | | |
|---|---|---|---|---|---|
| 875,844 | A | * | 1/1908 | Peacock | F16L 27/111 |
| | | | | | 285/420 |
| 1,625,684 | A | * | 4/1927 | Roddy | F16L 21/005 |
| | | | | | 285/412 |
| 2,127,456 | A | * | 8/1938 | Adams | F16L 55/172 |
| | | | | | 138/99 |
| 2,785,912 | A | * | 3/1957 | Risley | F16L 21/06 |
| | | | | | 285/337 |
| 3,252,192 | A | | 5/1966 | Smith | |
| 3,836,182 | A | * | 9/1974 | Miller | F16L 23/10 |
| | | | | | 285/368 |
| 4,502,189 | A | * | 3/1985 | Sieberkrob | F16L 21/06 |
| | | | | | 285/424 |
| 5,026,096 | A | * | 6/1991 | Lutz, II | F16L 21/002 |
| | | | | | 285/373 |
| 5,161,828 | A | * | 11/1992 | Hynes | E21B 43/013 |
| | | | | | 166/347 |
| 5,741,029 | A | * | 4/1998 | Wilson | F16L 25/14 |
| | | | | | 285/424 |

(Continued)

FOREIGN PATENT DOCUMENTS

| | | |
|---|---|---|
| CN | 115059812 A | 9/2022 |

OTHER PUBLICATIONS

French Search Report for corresponding French Patent Application No. 2309699 dated Feb. 29, 2024.

*Primary Examiner* — David Bochna
(74) *Attorney, Agent, or Firm* — Greer, Burns & Crain Ltd.

(57) ABSTRACT

A set of pipes comprising two pipes, a sleeve into which the pipes are fitted, for each pipe, a clamping collar arranged around the sleeve and an anchoring element secured to the pipe and comprising a first fastener, for each clamping collar, a retaining element secured to the clamping collar and having a through-passage, and a tie passing through the through-passages and having, at each end, a second fastener cooperating with a first fastener in order to fasten each end of the tie an anchoring element.

6 Claims, 4 Drawing Sheets

(56)                References Cited

U.S. PATENT DOCUMENTS

| | | | | |
|---|---|---|---|---|
| 8,070,190 | B2* | 12/2011 | Pires Cabado | F16L 25/12 |
| | | | | 285/368 |
| 9,395,025 | B2* | 7/2016 | Ireland | E03C 1/12 |
| 2008/0042430 | A1 | 2/2008 | Ichikawa | |
| 2014/0299721 | A1* | 10/2014 | Habrzyk | F16L 33/04 |
| | | | | 248/73 |
| 2015/0115605 | A1* | 4/2015 | Gramza | F16L 21/06 |
| | | | | 285/410 |
| 2019/0162341 | A1* | 5/2019 | Chiproot | F16L 58/185 |
| 2020/0088328 | A1* | 3/2020 | O'Neil | F16L 21/06 |

* cited by examiner (PRIOR ART)

SET OF PIPES COMPRISING AN IMPROVED RETAINING SYSTEM

CROSS-REFERENCES TO RELATED APPLICATIONS

This application claims the benefit of French Patent Application Number 2309699 filed on Sep. 14, 2023, the entire disclosure of which is incorporated herein by way of reference.

FIELD OF THE INVENTION

The present invention relates to a set of pipes comprising two pipes and an improved retaining system.

BACKGROUND OF THE INVENTION

Pipes are installed in various installations, in particular means of transport and, more particularly, aircraft. These pipes serve, for example, to distribute conditioned air between the various parts of the installation.

In order to cover large lengths, it is sometimes necessary for pipes to be butt-jointed to one another in succession.

FIG. 4 shows a set of pipes 400 from the prior art, viewed in section. This set of pipes 400 comprises a first pipe 402*a* and a second pipe 402*b* extending one another at their ends, and a sleeve 404 having a first end into which is fitted one end of the first pipe 402*a* and a second end into which is fitted one end of the second pipe 402*b*.

In order to clamp the sleeve 404 onto each pipe 402*a-b*, the set of pipes 400 comprises, for each pipe 402*a-b*, a clamping collar 406*a-b* arranged around the sleeve 404 and clamping the sleeve 404 against the pipe 402*a-b* in question.

Although such an installation is satisfactory, what may occur when the pipes 402*a-b* have a large diameter is that the clamping collars 406*a-b* are positioned obliquely with respect to the diameter of the pipe (here the first pipe 402*a*).

Following vibrations, the oblique clamping collar 406*a* may move and, in particular, straighten up, which causes the sleeve 404 to loosen from the first pipe 402*a*. As a result of vibrations, the clamping collar 406*a* which has become loose may break at the risk of damaging external elements as it detaches.

It is therefore necessary to find an arrangement that ensures that the clamping collars remain in place even in the event of breakage.

SUMMARY OF THE INVENTION

An object of the present invention is to propose a set of pipes which comprises a system for retaining the clamping collars.

Accordingly, what is proposed is a set of pipes comprising:

a first pipe and a second pipe extending one another, a sleeve having a first end into which is fitted one end of the first pipe and a second end into which is fitted one end of the second pipe, for each pipe, a clamping collar arranged around the sleeve and clamping the sleeve against said pipe, for each pipe, an anchoring element secured to said pipe and comprising a first fastening means, for each clamping collar, a retaining element secured to said clamping collar and having a through-passage, and for the pair of first fastening means and the pair of retaining elements, a tie passing through the through-passages of the two retaining elements and having, at each end, a second fastening means cooperating with a first fastening means in order to fasten each end of the tie to an anchoring element.

With such an arrangement, even if a clamping collar breaks, it remains attached by the tie, which prevents it from damaging other elements.

Advantageously, each anchoring element comprises a plurality of first fastening means, where each first fastening means of one anchoring element is associated with a first fastening means of the other anchoring element, for each pair of thus associated first fastening means and for each clamping collar, the set of pipes comprises a retaining element secured to said clamping collar and having a through-passage, and for each pair of thus associated first fastening means, the set of pipes comprises a tie passing through the through-passages of said two retaining elements and having, at each end, a second fastening means cooperating with a first fastening means of a first fastening means of the pair.

According to one particular embodiment, each anchoring element takes the form of a ring fitted and fastened around the corresponding pipe.

Advantageously, the ring is split.

According to one particular embodiment, each anchoring element takes the form of a plate.

Advantageously, each first fastening means takes the form of a drilled hole into which the end of the tie is inserted.

Advantageously, each second fastening means takes the form of an element secured to the end of the tie and arranged on the other side of the drilled hole with respect to the retaining elements.

BRIEF DESCRIPTION OF THE DRAWINGS

The features of the invention mentioned above, as well as others, will become more clearly apparent on reading the following description of an exemplary embodiment, said description being given with reference to the appended drawings, in which.

DETAILED DESCRIPTION OF THE PREFERRED EMBODIMENTS

Figure 1:
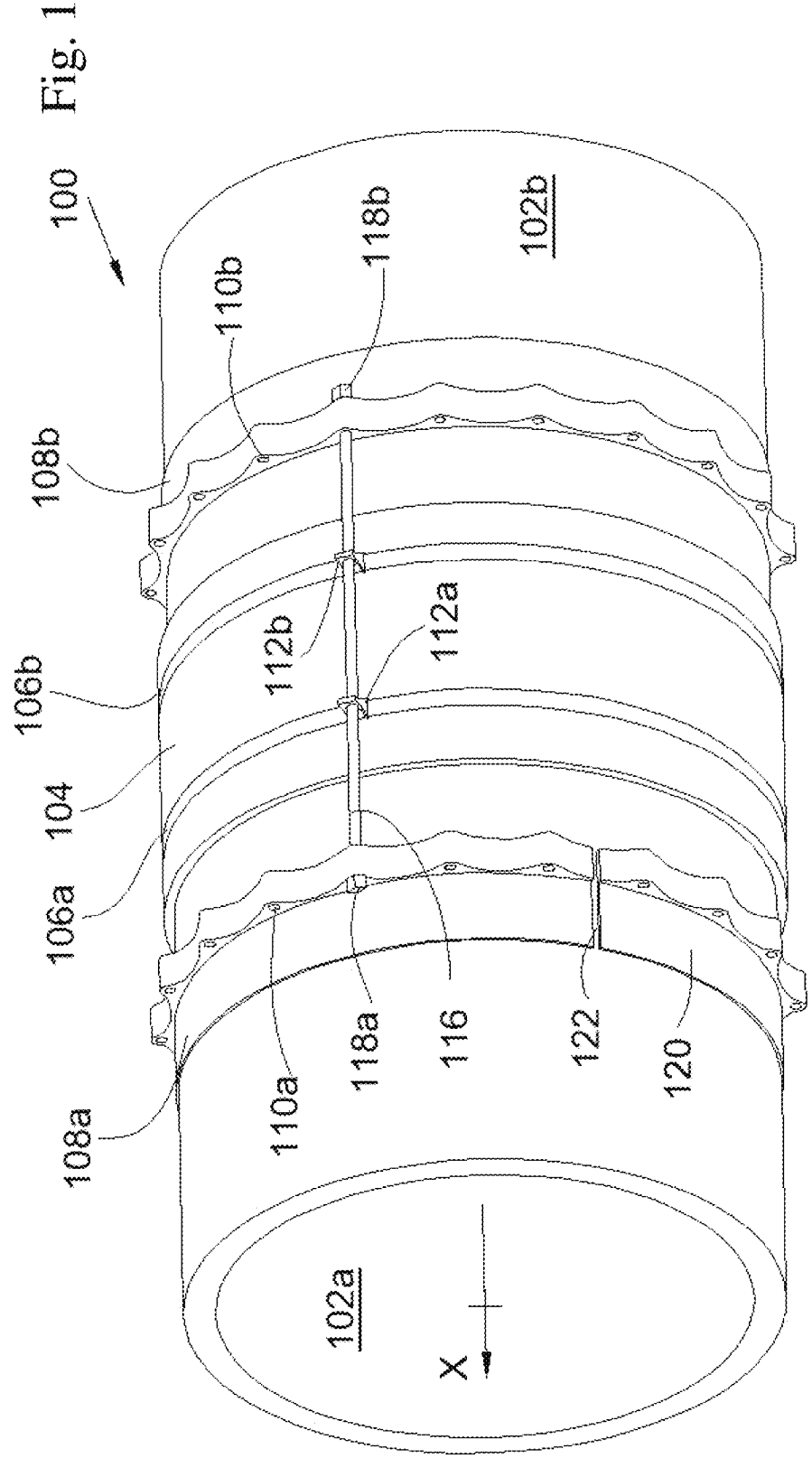
FIG. 1 shows a perspective view of a set of pipes according to a first embodiment of the invention.
Figure 3:
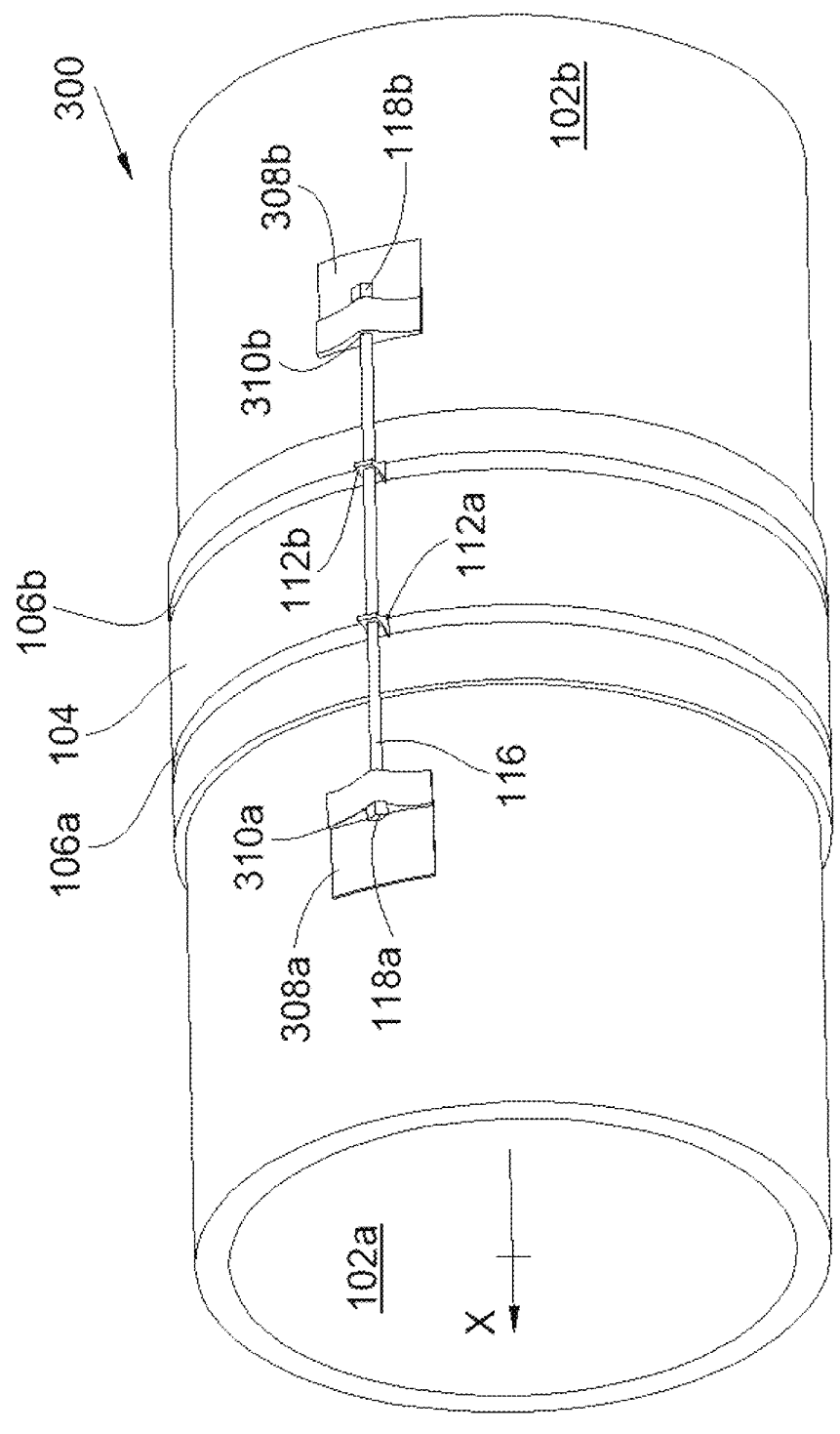
FIG. 3 shows a perspective view of a set of pipes according to a second embodiment of the invention.
Figure 4:
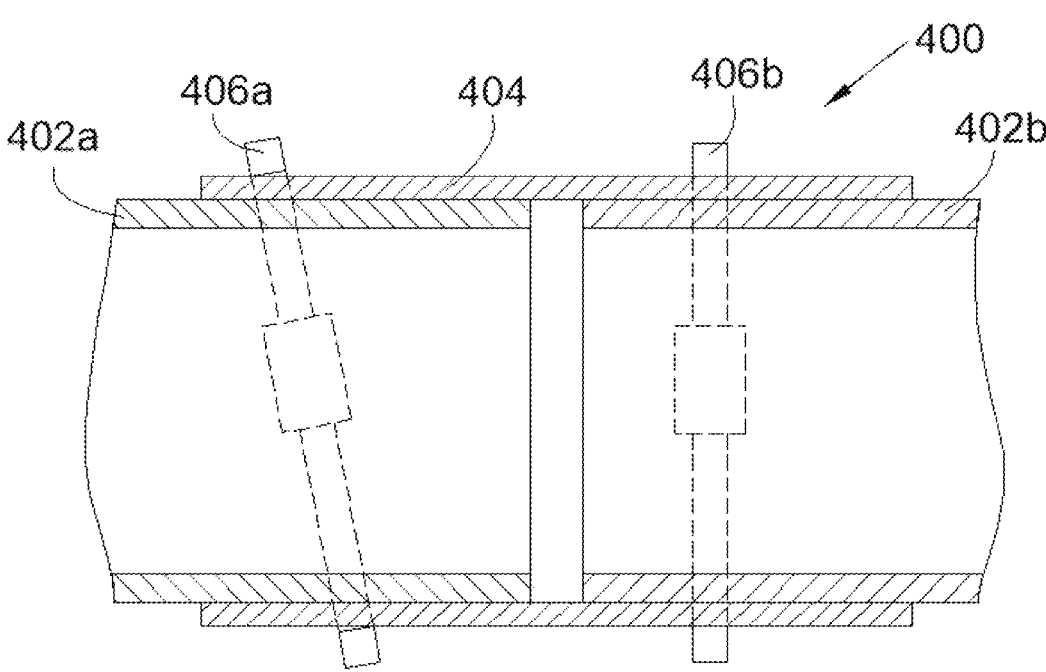
FIG. 4 shows a view in section of a set of pipes from the prior art.

FIG. 1 shows a set of pipes 100 according to a first embodiment of the invention, and FIG. 3 shows a set of pipes 300 according to a second embodiment of the invention.

As in the case of the prior art, the set of pipes 100, 300 comprises a first pipe 102*a* and a second pipe 102*b* extending one another at their ends, and a sleeve 104 having a first end into which is fitted one end of the first pipe 102*a* and a second end into which is fitted one end of the second pipe 102*b*.

In order to fasten the sleeve 104 to the pipes 102*a-b*, the set of pipes 100, 300 comprises, for each pipe 102*a-b*, a clamping collar 106*a-b* which is arranged around the sleeve 104 and which clamps the sleeve 104 against the pipe 102*a-b* in question, in particular by deformation of the sleeve 104.

As in the case of the prior art, a clamping collar 106*a* is arranged around the end of the first pipe 102*a* which is in the sleeve 104, and a clamping collar 106*b* is arranged around the end of the second pipe 102*b* which is in the sleeve 104.

For each pipe 102*a-b*, the set of pipes 100, 300 comprises an anchoring element 108*a-b*, 308*a-b*, which has a different form in the two embodiments. Each anchoring element 108*a-b*, 308*a-b* is secured to the pipe 102*a-b* in question and comprises a first fastening means 110*a-b*, 310*a-b*.

Figure 2:
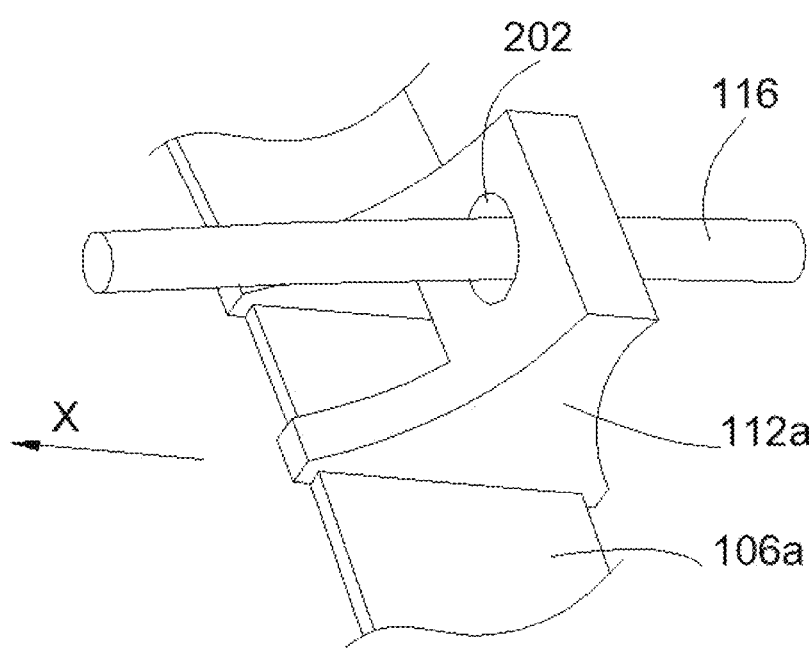
FIG. 2 shows a perspective view of a retaining element employed in the set of pipes according to the invention.

For each clamping collar 106*a-b*, the set of pipes 100, 300 comprises a retaining element 112*a-b*, one embodiment of which can be better seen in FIG. 2. Each retaining element 112*a-b* is secured to the clamping collar 106*a-b* in question, for example by adhesive bonding, crimping or the like. Each retaining element 112*a-b* has a through-passage 202 which passes through the retaining element 112*a-b* and which, in particular, is preferably generally parallel to an axis X common to the pipes 102*a-b*.

For the pair of first fastening means 110*a-b*, 310*a-b* and the pair of retaining elements 112*a-b*, the set of pipes 100, 300 comprises a tie 116, typically a flexible tie such as a cable. The tie 116 passes through the through-passages 202 of the two retaining elements 112*a-b* and has, at each end, a second fastening means 118*a-b* cooperating with a first fastening means 110*a-b*, 310*a-b* in order to fasten each end of the tie 116 to an anchoring element 108*a-b*, 308*a-b*.

A first end of the tie 116 thus bears a second fastening means 118*a* which cooperates with the first fastening means 110*a*, 310*a* of one anchoring element 108*a*, 308*a*, a second end of the tie 116 thus bears a second fastening means 118*b* which cooperates with the first fastening means 110*b*, 310*b* of the other anchoring element 108*b*, 308*b*, and between the first fastening means 110*a-b*, 310*a-b*, the tie passes through the two retaining elements 112*a-b*.

With such an arrangement, even after breakage of one or of the two clamping collars 106*a-b*, the collar 106*a-b* which is broken remains held between the two first fastening means 110*a-b*, 310*a-b* and does not risk damaging adjacent components. The retaining elements 112*a-b* additionally make it possible to keep the tie 116 at a distance from the clamping collars 106*a-b* and thus prevent it from wearing by rubbing against the clamping collars 106*a-b* in the course of use.

In the embodiment described above, there is only one tie 116, but there may be a plurality of them distributed angularly about the axis X. There is then a pair of first fastening means 110*a-b*, 310*a-b* and a pair of retaining elements 112*a-b* per tie 116.

In the first embodiment of the invention presented in FIG. 1, each anchoring element 108*a-b* takes the form of a ring 120 fitted and fastened around the corresponding pipe 102*a-b*.

In this embodiment, there are a plurality of first fastening means 110*a-b* which are distributed angularly around the ring 120, and it is possible to put a plurality of retaining elements 112*a-b* on each clamping collar 106*a-b* and, finally, a plurality of ties 116.

The placement of the ring 120 is easier during the first installation of the pipes 102*a-b*, since the ring 120 can be fastened directly during the manufacture of the pipes 102*a-b*.

To aid clamping of the ring 120 on the pipe 102*a-b*, the ring 120 may be split at a slot 122.

In the second embodiment of the invention presented in FIG. 3, each anchoring element 308*a-b* takes the form of a plate bearing a single first fastening means 310*a-b*.

This embodiment is more particularly suitable in the case of retrofitting an installation of the prior art when the placement of a ring 120 is not possible without complete disassembly of the installation.

In the second embodiment of the invention presented in FIG. 3, there is only one pair of plates and retaining elements 112*a-b* and therefore a single tie 116, but it is possible to multiply these elements around the pipes 102*a-b*.

The fastening of each anchoring element 108*a-b*, 308*a-b* can be achieved by any suitable means, such as welding, adhesive bonding, riveting, etc.

Prior to placing a tie 116, the anchoring elements 108*a-b*, 308*a-b* are fastened to the pipes 102*a-b*, and the retaining elements 112*a-b* are fastened to the clamping collars 106*a-b*.

During a new installation, the ends of the pipes 102*a-b* are inserted into the sleeve 104, and the pipes 102*a-b* are arranged in such a way that the anchoring elements 108*a-b*, 308*a-b*, and more particularly the first fastening means 110*a-b*, 310*a-b*, are aligned parallel to the axis X, even though a slight angular offset does not interfere with the functioning of the invention.

The clamping collars 106*a-b* are then placed around the sleeve 104 and clamped. During their placement, the clamping collars 106*a-b* are preferably arranged so as to align the through-passages 202 between the first fastening means 110*a-b*, 310*a-b*, even though a slight angular offset does not interfere with the functioning of the invention.

During the retrofitting of an existing installation, the anchoring elements 108*a-b*, 308*a-b* are fastened so as to be aligned parallel to the axis X, even though a slight angular offset does not interfere with the functioning of the invention. Subsequently, the retaining elements 112*a-b* are fastened to the clamping collars 106*a-b* preferably so as to align the through-passages 202 between the first fastening means 310*a-b*, even though a slight angular offset does not interfere with the functioning of the invention.

In the various embodiments, a tie 116 is then placed through the two through-passages 202 and each of its ends is fastened to a first fastening means 110*a-b*, 310*a-b* by way of the second fastening means 118*a-b* in question.

Furthermore, when the first fastening means 110*a-b*, 310*a-b* and the retaining elements 112*a-b* are aligned, and when the tie 116 is tensioned between the first fastening means 110*a-b*, 310*a-b*, this ensures minimum retention of the pipes 102*a-b* with respect to one another in the event of breakage of one or of the clamping collars 106*a-b*.

Generally, in the case where there are a plurality of ties 116 in the first embodiment of the invention, each anchoring element 108*a-b* comprises a plurality of first fastening means 110*a-b*.

Each first fastening means 110*a-b* of one anchoring element 108*a-b* is associated with a first fastening means 110*b-a* of the other anchoring element 108*b-a*, and they are preferably aligned parallel to the axis X.

For each pair of thus associated first fastening means 110*a-b*, each clamping collar 106*a-b* is equipped with a retaining element 112*a-b* secured to said clamping collar 106*a-b* and having the through-passage 202.

Finally, for each pair of the associated first fastening means 110*a-b*, the set of pipes 100 comprises the tie 116 which passes through the through-passages 202 of the two retaining elements 112*a-b* and which has, at each end, a second fastening means 118*a-b* cooperating with a first fastening means 110*a-b* of a first fastening means of the pair.

In the various embodiments presented, each first fastening means 110*a-b*, 310*a-b* takes the form of a drilled hole into which the end of the tie 116 is inserted, but other forms are possible.

Each second fastening means 118*a-b* takes the form of an element secured to the end of the tie 116 and it is arranged on the other side of the drilled hole with respect to the retaining elements 112*a-b*, that is to say on the outside of the first fastening means 110*a-b*, 310*a-b*. Each second fastening means 118*a-b* may be a knot formed at the end of the tie 116, or an additional element, of the nut type, fastened to the end of the tie 116.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A set of pipes comprising:

a first pipe and a second pipe extending one another, a sleeve having a first end into which is fitted one end of the first pipe and a second end into which is fitted one end of the second pipe, for each pipe, a clamping collar arranged around the sleeve and clamping the sleeve against said pipe, for each pipe, an anchoring element secured to said pipe and comprising a first fastening means, for each clamping collar, a retaining element secured to said clamping collar and having a through-passage, and for a pair of first fastening means and a pair of retaining elements, a tie passing through the through-passages of the two retaining elements and having, at each end, a second fastening means cooperating with one of the first fastening means of the pair of first fastening means in order to fasten each end of the tie to an anchoring element, wherein each anchoring element comprises a plurality of first fastening means, wherein each first fastening means of one anchoring element is associated with a first fastening means of the other anchoring element, wherein for each pair of associated first fastening means and for each clamping collar, the set of pipes further comprises a retaining element secured to said clamping collar and having a through-passage, and wherein, for each pair of associated first fastening means, a tie passes through the through-passages of said retaining elements and, at each end, the tie comprises a second fastening means, each second fastening means cooperating with a first fastening means from the pair of associated first fastening means.

2. The set of pipes according to claim 1, wherein each anchoring element comprises a ring fitted and fixed around the corresponding pipe.

3. The set of pipes according to claim 2, wherein the ring is split.

4. The set of pipes according to claim 1, wherein each anchoring element comprises a plate.

5. The set of pipes according to claim 1, wherein each first fastening means comprises a drilled hole into which the end of the tie is inserted.

6. The set of pipes according to claim 5, wherein each second fastening comprises an element secured to the end of the tie and arranged on a side of the drilled hole with respect to the retaining elements.

\* \* \* \* \*